Dec. 8, 1931.  A. B. WILLI  1,835,127
CRANKSHAFT SEAL
Filed Oct. 5, 1927
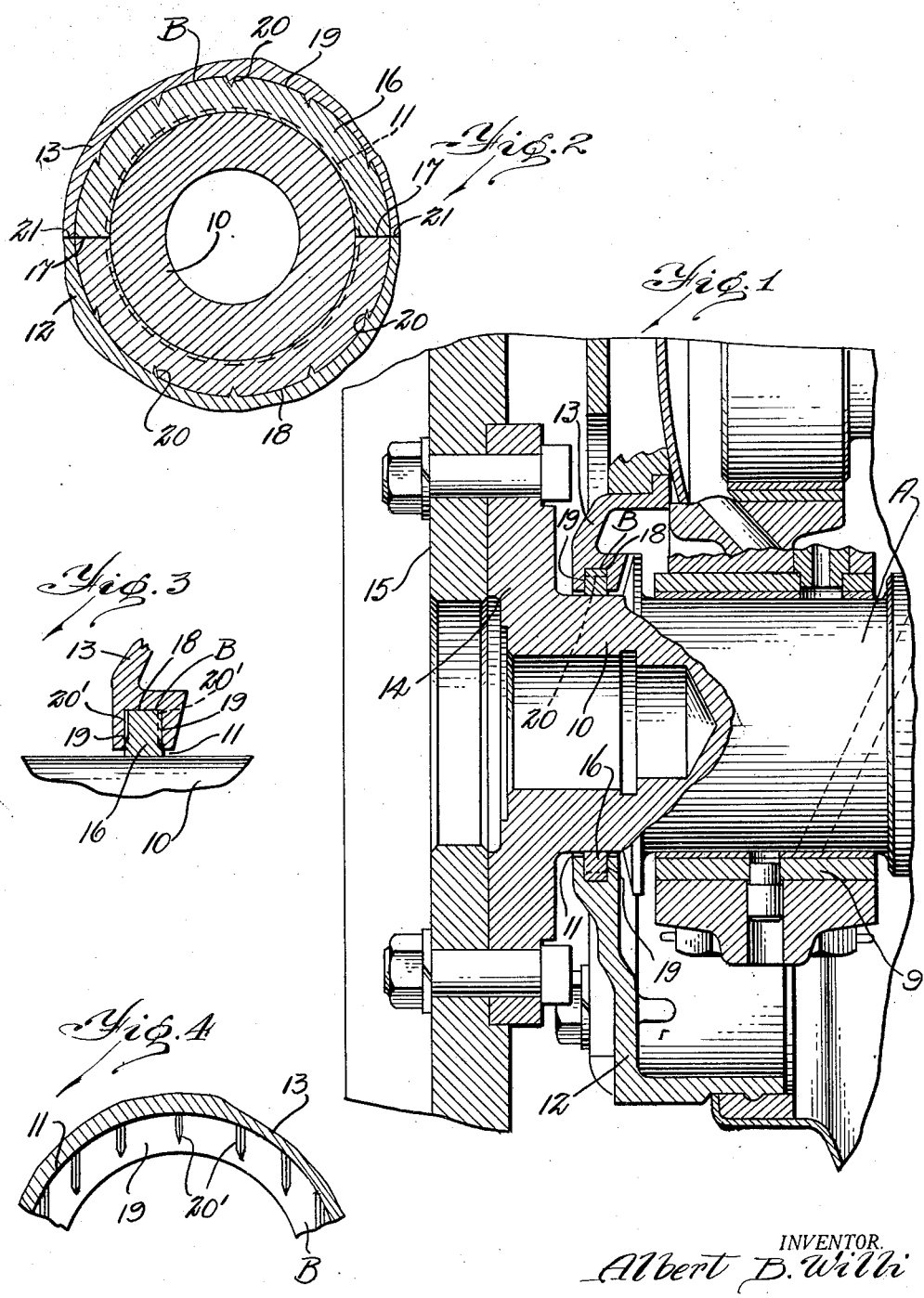
INVENTOR.
Albert B. Willi
BY W. W. Harris
ATTORNEY.

Patented Dec. 8, 1931

1,835,127

UNITED STATES PATENT OFFICE

ALBERT B. WILLI, OF DETROIT, MICHIGAN, ASSIGNOR TO CONTINENTAL MOTORS CORPORATION, OF DETROIT, MICHIGAN, A CORPORATION OF VIRGINIA

CRANKSHAFT SEAL

Application filed October 5, 1927. Serial No. 224,134.

This invention relates to internal combustion engines and refers more particularly to an improved seal for engine crankshafts. It is customary at the present time to provide an annular split sealing ring of a yielding character, such as cork or other material possessing sealing characteristics, positioned between the crankshaft and crankcase for preventing the escape of crankcase oil. In practice it is found that rotation of the shaft tends to rotate the sealing ring segments resulting in their relative displacement and consequent leakage at the joints of the ring segments.

One object of my invention is to provide a construction particularly adapted to prevent rotation of a split sealing ring which bears on the rear end of the crankshaft where the latter passes through the crankcase. My invention further resides in the provision of a crankshaft seal which may be manufactured cheaply and easily. Several sealing devices have been suggested heretofore but I have found such prior constructions to be more mostly and less efficient than my invention.

With a further view toward simplifying and cheapening the cost of manufacture I have provided a sealing ring groove provided with one or more serrations so arranged as to permit convenient and relatively cheap die casting.

With the above and other objects in view my invention further resides in the novel arrangement and combination of parts more particularly hereinafter described and claimed.

In the drawings in which like reference characters indicate corresponding parts, Fig. 1 is a detail sectional view of the rear portion of an engine crankshaft and crankcase showing my improved crankshaft sealing means, Fig. 2 is a section view through the sealing ring and crankshaft, Fig. 3 is a detail view transversely through the sealing ring showing a modified embodiment of my invention and Fig. 4 is a fragmentary view of the crankcase sealing ring groove shown in Fig. 3.

Referring to the drawings reference character A represent the engine crankshaft, which, according to present prevailing practice, may be rotatably supported in rear bearing 9, the rear crankshaft portion 10 extending through an opening 11 formed by the lower member or rear bearing filler block 12 and the upper member or crankcase portion 13. It will be readily understood that the crankcase members 12 and 13 are relatively removable in order to permit assembly on the crankshaft end which usually terminates in flange 14 for the flywheel 15. It is customary to provide a small amount of clearance between the crankshaft 10 and the surrounding crankcase members 12 and 13, such clearance being sealed by a sealing ring 16 likewise diametrically split at 17. The ring 16 may be formed of cork or other yielding material having the desired sealing and wearing characteristics and is positioned in the annular groove B formed in the crankcase members 12 and 13. This annular groove preferably has a bottom wall 18 and side walls 19.

The ring 16 has a tendency to rotate in the groove B due to its contact with the crankshaft 10, which rotation tends to crowd the ring sections at one of the joints 17 leaving the diametrically opposite ring ends spaced, resulting in leakage of crankcase oil past the crankshaft. In order to prevent rotation of the sealing ring sections I have provided a plurality of annularly spaced serrations 20 or other portions extending inwardly of the groove. These serrations may be extended from the bottom wall 18 of the groove B and are preferably pointed so as to bite into the sealing ring sections 16. By arranging these serrations so that they extend in a common direction for each respective crankcase member 12 and 13, such as perpendicularly with the diameter containing the meeting edges 21 of the crankcase members, for example the latter members may be die cast, affording an inexpensive method of construction. Thus since the serrations of each member 12 and 13 all point in a common direction the core may be readily pulled permitting the die casting operation. I regard this feature of my invention as contributing considerably toward the relatively low cost of manufacturing my sealing device although if desired the serrations 20 may be struck up after casting or otherwise forming the crankcase elements 12 and 13 so as to extend in any desired direction.

In assembling the device the sealing ring segments 16 may be pressed within the groove B, the serrations 20 biting into the sealing ring so as to prevent displacement of the sealing ring relative to the housing groove B.

Instead of forming the serrations in the bottom wall 18 such serrations 20' may be formed in either or both of the side walls 19 of groove B such as shown in Figs. 3 and 4. In these figures the serrations 20' preferably terminate short of the opening 11 whereby in assembly, the sealing ring segments 16 may be conveniently guided into the groove before encountering the serrations. Furthermore as shown in Fig. 3 the serrations 20' are preferably staggered along the opposed side walls 19.

What I claim as my invention is:

1. A device of the character described comprising in combination, a rotatable shaft, cooperating relatively fixed members surrounding the shaft and formed with an opening receiving one end of the shaft, said members being formed with an annular groove concentric with the shaft and opening toward the shaft, said groove being provided with a plurality of serrations formed in a wall of the groove, and an annular yielding segmental sealing ring within the annular groove sealing the shaft against escape of fluid, the serrations biting into the annular sealing ring to prevent rotation of the sealing ring and relative displacement of the segments thereof, said serrations of one of said members being parallel.

2. A device of the character described comprising a casing structure formed with an opening receiving a shaft portion, said casing having an annular groove opening into said opening, said groove provided with parallel serrations formed integrally with a wall of the groove, and a yielding segmental sealing ring within the groove, said serrations engaging the sealing ring preventing rotation thereof and relative displacement of the ring segments.

3. A device of the character described comprising a casing structure formed with an opening receiving a shaft portion, said casing having an annular groove opening into said opening, said groove provided with parallel serrations, and a yielding segmental sealing ring within the groove, said serrations engaging the sealing ring preventing rotation thereof and relative displacement of the ring segments.

4. A device of the character described comprising a casing structure formed with an opening receiving a shaft portion, said casing having an annular groove opening into said opening, said groove provided with serrations extending from the bottom of the groove to a point short of the opening, and a yielding segmental sealing ring within the groove, said serrations engaging the sealing ring preventing rotation thereof and relative displacement of the ring segments.

5. A sealing device comprising in combination with a rotatable shaft and grooved housing surrounding the shaft, a yielding segmental sealing ring within the groove contacting with the shaft, said groove provided with parallel serrations extending from the bottom of the groove inwardly toward the shaft to a point short of the shaft, said serrations engaging the sealing ring preventing rotation thereof and relative displacement of the ring segments at the meeting edges thereof.

In witness whereof, I hereunto subscribe my name this 29th day of September, A. D. 1927.

ALBERT B. WILLI.